United States Patent

Malutich

[15] 3,679,345
[45] July 25, 1972

[54] FLASHLESS COMPRESSION MOLD
[72] Inventor: William J. Malutich, Edinboro, Pa.
[73] Assignee: Continental Rubber Works, Erie, Pa.
[22] Filed: Aug. 20, 1970
[21] Appl. No.: 65,466

[52] U.S. Cl..............................................425/406, 425/357
[51] Int. Cl.........................................B29c 1/14, B29c 3/00
[58] Field of Search............18/16 R, 16.5, DIG. 35, DIG. 47, 18/34 R, 35, 42 R, 5.3 R, 5.3 F; 25/129

[56] References Cited

UNITED STATES PATENTS

| | | | |
|---|---|---|---|
| 847,820 | 3/1907 | Prescott | 18/5.3 F |
| 1,737,619 | 12/1929 | Smith | 18/5.3 F |
| 1,399,817 | 12/1921 | Steventon | 18/5.3 F |
| 3,392,226 | 7/1968 | McKinven Jr. | 18/DIG. 47 |

Primary Examiner—Robert L. Spicer, Jr.
Attorney—Ralph Hammar

[57] ABSTRACT

A metal mold for making flash free parts of elastomer. The mold has the parting line of the mold cavity formed by a narrow land of width such that the compression stress on the land does not exceed the elastic limit of the metal and all flash is squeezed outside the land so that the land always closes in metal-to-metal contact. Supplemental projections in the plane of the land may be provided to carry some of the load so that the pressure on the land does not exceed the elastic limit of the metal.

5 Claims, 3 Drawing Figures

PATENTED JUL 25 1972　　　　　　　　　　　3,679,345

INVENTOR
William J. Malutich

BY Ralph Hammar
ATTORNEY

FLASHLESS COMPRESSION MOLD

This invention is intended to produce flash free parts of elastomer in molds having the mold closing pressure supported by a land sufficiently narrow to clear the flash from the land under molding pressure so the mold always closes in metal-to-metal contact.

Figure 1:
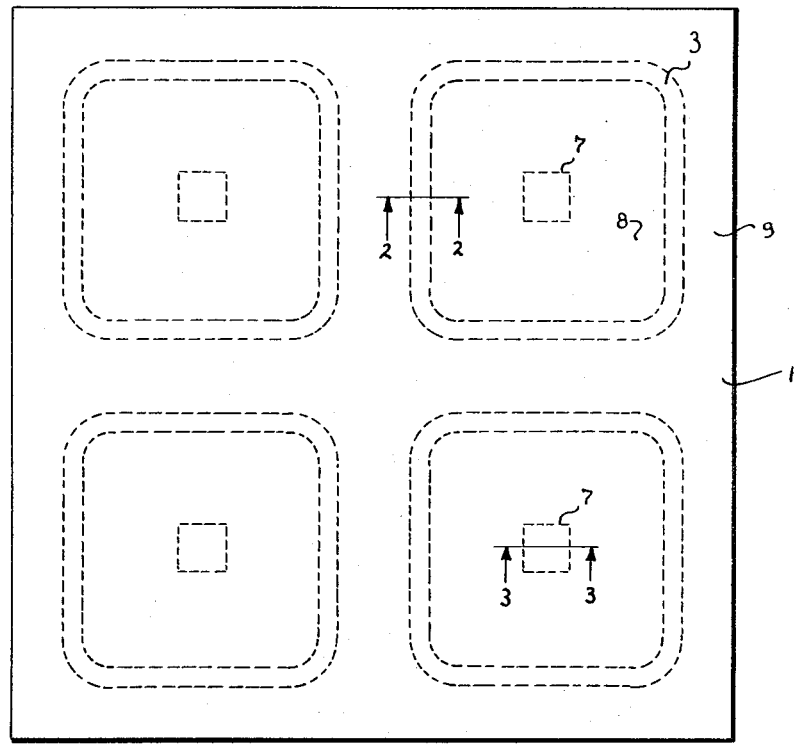
Figure 2:
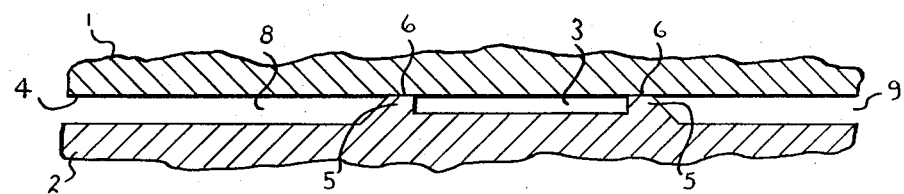
Figure 3:
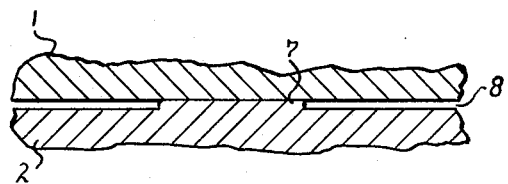

In the drawing, FIG. 1 is a plan view of a mold;
FIG. 2 is a section on line 2—2 of FIG. 1; and
FIG. 3 is a section on line 3—3 of FIG. 1.

The invention is shown in connection with a four-cavity mold having a metal top plate 1, a metal bottom plate 2 and four cavities 3 in the bottom plate. The cavities could be in the top plate or partly in both plates. The particular mold cavities are for rubber gaskets, but obviously could be of a different shape. The top plate has a plane lower surface 4 which forms the parting line of the mold. Each mold cavity as shown in FIG. 2 is bounded by a narrow land 5 each having surface 6 which engages the lower surface 4 of the top plate. The width of the surfaces 6 is narrow enough so that as the mold is closed, and the excess elastomer is squeezed out of the mold cavity through the parting line, all the elastomer is squeezed clear of the surfaces 6 and the final closure of the mold is in metal-to-metal contact. In order to achieve this result, the width of the lands should be in the range of substantially 10 to 30 mils and the unit pressure on the surfaces 6 of the lands should be substantially equal to, but not greater than the elastic limit of the metal of either the top or bottom plates. Considering the materials from which molds are usually made, the unit pressure on the surfaces 6 of the lands should not exceed 50,000 to 70,000 pounds per square inch. In the range of 50,000 to 70,000 pounds per square inch, the required squeezing pressure is obtained to make the surfaces self cleaning and at the same time no permanent deformation of the metal is obtained. Whatever strain is produced by the molding pressure disappears when the mold is opened. The surface 4 of the top plate remains flat. It is the combination of high unit pressure plus narrow width which achieves this result. If the surfaces 6 of the lands were a quarter of an inch wide, the self-cleaning or flash free feature would not be obtained even through the unit pressure were the same value.

The operating procedure is the same as for conventional molds. No change is required in the press control or timing or in the usual bumping to remove trapped air. Nor is there any limitation on the elastomer to be molded. Any elastomer which can be molded in a conventional mold, compression or transfer, can be molded in this mold. The elastomer can be of any diameter, elasticity or tensile strength. Because the molded parts are flash free, the advantages are particularly appreciated in highly elastic compounds where the flash is difficult to trim.

By having the mold always close in metal-to-metal contact, the mold cavities 3 are always solidly filled with elastomer and the molded article is always of the same dimensions as the mold cavity. This provides precision molded parts. It also eliminates all the expenses of trimming flash. In the conventional compression mold where there is always a flash at the mold parting line, the thickness of the flash varies with the amount of material loaded into the mold cavities and the dimensions of the finished parts are increased by the thickness of the flash. In this mold, even excessive overloading does not change the dimensions of the parts. This has been proven by intentionally overloading by 50 percent.

When running a mold in a particular press where the available pressure would result in exceeding the elastic limits of the metal if the pressure were limited solely to the narrow land area adjacent to the cavities, additional load-carrying projections 7 may be provided for taking some of the pressure. In the particular mold illustrated, there are four such projections and the area of these projections is such that a total force of the press when divided by the sum of the areas of the projections 7 plus the areas of the land surfaces 6 results in a unit pressure which does not exceed the elastic limit of the mold material, but does provide enough force to make the lands self cleaning. The projections 7 are shown on the lower plate 2 of the mold but obviously could be on the top plate.

The projections 7 are shown as separate square islands but can obviously be different in number and in shape. A single projection in the form of a land around the periphery of the mold would have the same function. Or the area of the projections 7 could be distributed among a greater or lesser number. The projections 7 can also be distributed so as to compensate for platen wear. In some older presses, the platens are worn at the center and are concave so the mold plates tend to close with greater pressure around the periphery or at the corners. This would tend to overload the land surfaces 6 of the cavities at the corners or around the periphery of the mold. The overloading can be corrected by arranging the load carrying projections in the areas where the overloading would occur. If the platens were convex, the projections 7 or their equivalent would be distributed at the center of the mold. It is usually preferable to distribute the projections or the equivalent load carrying area if a single projection is used.

The load carrying area of the projections 7 is never covered by elastomer or flash. Accordingly, there is no pressure on the projections 7 until the final metal-to-metal closure on the land surfaces 6. This means that until the final closure, the entire closing pressure is taken by the flash on the surfaces 6 and can be greater than the pressure after final closure. Since the greater pressure is on the flash, the elastic limit of the metal is not exceeded.

It is necessary that the excess elastomer squeezed out of the mold cavity have some place to go. Otherwise, a back pressure would develop which would prevent flash free or the self-cleaning action. For the particular mold shown, there are relief areas 8 and 9 on opposite sides of each mold cavity 3 large enough to accommodate all the elastomer squeezed outside the mold cavities. The material squeezed into the relief areas 8, 9 is not under any pressure and is easily removed when the mold is opened.

The lands 5, 6 and relief areas 8, 9 may be easily machined into existing molds to add the flash free feature.

In use, a charge of elastomer is loaded into each mold cavity and the press is closed under molding pressure. The elastomer flows to fill the cavities and the excess flows into the over flow spaces 8, 9. When the press is fully closed, the surfaces 6 and projections 7 are in metal-to-metal contact. All flash is squeezed clear of the surfaces 6 and the mold cavities are filled with solid elastomer.

The wear or erosion of the surfaces 6 is the same as the wear on a compression mold of conventional design. The narrow surfaces 6 do not increase the wear. In fact, since the wear starts at the corners of the lands adjoining the mold cavities, wear decreases the load carrying area of the surfaces 6 and the higher unit pressure on the remainder of the surfaces would tend to shift the wear away from the corners and maintain the original width and flatness of the surfaces.

In old molds where the parting lines of the cavities are uneven, the pressure of the lands concentrates on the high spots and produces a deformation which tends to equalize the unevenness.

I claim:
1. A mold for elastomers having separable metal parts which in the closed position have means providing a mold cavity, said parts having surfaces adjoining the mold cavity engaging in metal to metal contact in the closed position, one surface being relatively wide and the other surface being a land of width substantially from 10 mils to 30 mils so all flash is squeezed from between said surfaces when the mold is under molding pressure, the unit pressure on said land being below the elastic limit of the metal, and means providing relief or over-flow space adjoining said other surface for flash squeezed from between said surfaces.

2. The mold of claim 1 in which the unit pressure is substantially from 50,000 to 70,000 lbs./sq. in.

3. The mold of claim 1 in which separable parts comprise steel plates, one plate having a plane surface against which the land on the other plate closes.

4. The mold of claim 1 having on one of the parts of the mold a projection spaced from said land and outside the mold cavity which engages the other part of the mold in metal to metal contact in the closed position and carries part of the load to limit the pressure on said land.

5. The mold of claim 4 in which the unit pressure is substantially from 50,000 to 70,000 lbs./sq. in.

* * * * *

PO-1050
(5/69)

UNITED STATES PATENT OFFICE
CERTIFICATE OF CORRECTION

Patent No. 3,679,345      Dated July 25, 1972

Inventor(s) William J. Malutich

It is certified that error appears in the above-identified patent and that said Letters Patent are hereby corrected as shown below:

The present sheet of drawing headed by Patent No. 3,679,346 was inadvertently inserted in the official grant (only) of Letters Patent No. 3,679,345 and should be canceled.

Signed and sealed this 27th day of February 1973.

(SEAL)
Attest:

EDWARD M. FLETCHER, JR.      ROBERT GOTTSCHALK
Attesting Officer      Commissioner of Patents